United States Patent [19]

Tsurumi et al.

[11] Patent Number: 5,480,851
[45] Date of Patent: Jan. 2, 1996

[54] PROCESS OF PREPARING CATALYST SUPPORTING HIGHLY DISPERSED METAL PARTICLES

[75] Inventors: Kazunori Tsurumi, Kanagawa, Japan; Paul Stonehart, Madison, Conn.

[73] Assignees: Tanaka Kikinzoku Kogyo K.K., Japan; Stonehart Associates Inc., Madison, Conn.

[21] Appl. No.: 88,073

[22] Filed: Jul. 6, 1993

[30]     Foreign Application Priority Data

Jul. 6, 1992   [JP]   Japan ..................................... 4-202002

[51] Int. Cl.$^6$ ............................... B01J 29/04; B01J 31/00
[52] U.S. Cl. ............................ 502/185; 502/85; 502/172; 502/181
[58] Field of Search ..................... 502/172, 181, 502/185, 85

[56]           References Cited

U.S. PATENT DOCUMENTS 3,992,512  11/1976  Petrow et al. ........................... 502/223
4,136,059   1/1979  Jalan et al. .............................. 502/230
4,247,421   1/1981  McDaniel et al. ....................... 502/171
4,791,226  12/1988  Puskas et al. ............................. 502/85

*Primary Examiner*—Asok Pal
*Assistant Examiner*—E. D. Irzinsky
*Attorney, Agent, or Firm*—Klauber & Jackson

[57]            ABSTRACT

Disclosed herein is a process of preparing a catalyst having narrow particle size distribution and supported with monodispersed metal particles of which a particle size is about less than 20 Å. In the present invention, propargyl alcohol is employed in place of a sulfur-containing agent for supporting the metal particles on a support thereby avoiding the contamination of the sulfur component and the high temperature treatment for decomposing the sulfur-containing agent. Accordingly, the resulting catalyst contains no sulfur contaminant and substantially no agglomerated metal particles.

6 Claims, 1 Drawing Sheet

PROCESS OF PREPARING CATALYST SUPPORTING HIGHLY DISPERSED METAL PARTICLES

BACKGROUND OF THE INVENTION

The present invention relates to a process of preparing a catalyst which supports highly dispersed metal particles utilized in the field of catalysts.

Catalysts which support metals are widely utilized in various chemical reactions. Especially in the case of utilizing such an expensive catalyst as a precious metal, in order to effectively utilize the catalytically active metal, the particle diameter of the metal particles are required to be reduced as much as possible and to be uniformly supported on a support. Many attempts have been made especially for supporting metal particles having the minimum diameters on a support.

As disclosed in U.S. Pat. Nos. 3,992,512 and 4,136,059, as a method of supporting metal particles having a diameter of below 20 Å on a support, a method has been proposed which comprises reacting such a sulfur-containing compound as sodium sulfite and sodium dithionate and chloroplatinic acid, supporting resulting colloid-like platinic acid complex compound containing the sulfur, and oxidatively treating it with such an oxidant as hydrogen peroxide to obtain the support supported with fine platinum particles. The method is effective as far as the supporting of the platinum particles is concerned.

In the platinum-supported catalyst obtained through the conventional process, liberated colloid-like sulfur and a sulfate formed by the reaction of the above compound are contained. The liberated sulfur which is a well-known catalytic poison against platinum strongly bonds the platinum to lower the catalytic performance. The sulfate is non-volatile so that its removal should be conducted by water-washing. The sulfate remained produces several inconveniences on the employment of the catalyst such as the existence as impurities and an undesired reaction with the support. Although the liberated sulfur remained can be removed by thermal treatment in a hydrogen flow or in an oxidative flow, the heating may create the increase of the particle diameter through the agglomeration of the metal particles so that the desired particles cannot be obtained.

SUMMARY OF THE INVENTION

An object of the present invention is to provide a process of preparing a catalyst which supports monodispersed metal particles.

Another object of the invention is to provide a process of preparing a catalyst having narrow particle size distribution and a particle diameter of about less than 20 Å.

A further object of the invention is to provide a process of preparing a catalyst having highly dispersed metal particles without employing a sulfur-containing agent.

The present invention has been made to overcome the above problems. The catalyst supporting monodispersed metal particles which has the narrow particle size distribution and of which a particle diameter is less than about 20 Å can be obtained by adding propargyl alcohol to a solution containing a metal-containing ion and a support to which metal particles formed by the reduction of the metal-containing ion are supported, supporting the reaction product between the metal-containing ion and the propargyl alcohol on the support and thermally treating the support in a reduction gas containing a hydrogen gas to reduce the reaction product between the metal-containing ion and the propargyl alcohol on the support.

In the present invention, propargyl alcohol is employed in place of a sulfur-containing agent for supporting the metal particles on a support thereby avoiding the contamination of the sulfur component and the high temperature treatment for decomposing the sulfur-containing agent. Accordingly, the resulting catalyst contains no sulfur contaminant and substantially no agglomerated metal particles.

Therefore, in accordance with the present invention, a highly dispersed metal-supported catalyst having a clean and active metal surface and the metal particles of which a particle size is about less than 20 Å can be obtained. Further, the metal containing rate of the resulting catalyst may reach to 10% in weight which is a target value of the metal-supported catalyst.

DETAILED DESCRIPTION OF THE INVENTION

Figure 1:
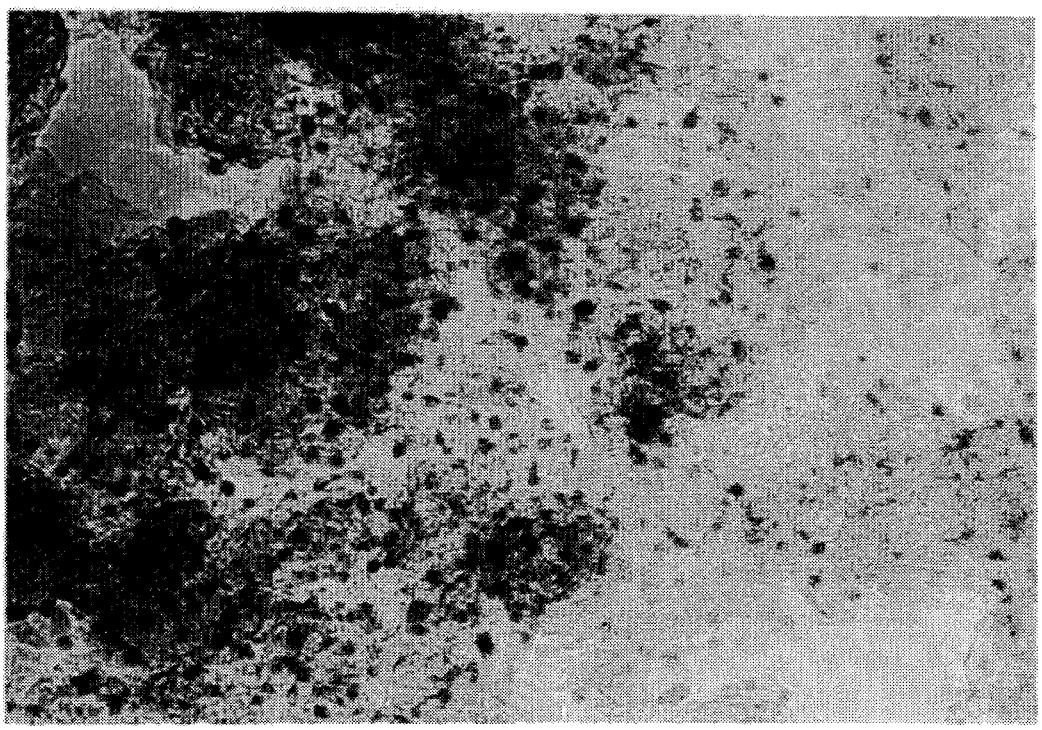
FIG. 1 is a microphotograph of 1,000,000 magnifications of the supported carbon black catalyst obtained in Example 1 observed with a transmission electronic microscope.

The reason why the propargyl alcohol is added to the solution containing the metal-containing ion in the present invention is to support the metal ion on the support after the metal ion is converted into colloid-like particles. If the propargyl alcohol is added to such a platinum-containing solution as a chloroplatinic acid solution containing no catalyst support under stirring, brown colloid-like particles are formed. The platinum containing rate of the particles in this case is about 65% in weight upon analysis. These particles are not metal colloid of the platinum and are considered to be a platinum compound and the propargyl alcohol though its structure is unknown. For this reason, the initial addition of the propargyl alcohol to a metal-containing solution containing the support material enables to finely support the above compound on the support, and by thermally treating it in a hydron-containing flow, a catalyst which supports highly monodispersed metal particles of which a particle diameter is less than about 20 Å can be obtained.

Although, as a metal-containing ion of the present invention, any ion containing an ordinary metal utilized as a catalyst metal such as rhodium and ruthenium can be employed, an ion or ions containing palladium and/or platinum of which catalytic activities are high may be preferably employed. By employing a mixed solution of a platinum ion and a palladium ion, a catalyst supporting a platinum-palladium eutectoid mixture can be obtained.

As a support of the present invention, any material which is stable in a reduction atmosphere and in a reaction condition in which the resulting catalyst is employed can be utilized. The most desirable support material is carbon black.

Most parts of the propargyl alcohol employed in the present invention may be removed by evaporation in the thermal treatment in the hydrogen-containing flow. Even if a small amount of the propargyl alcohol remains, the alcohol does not contain any substance which acts as a catalytic poison so that the lowering of the catalytic performance is never expected.

EXAMPLES

Although Examples of the invention will be described, these Examples are not construed to restrict the scope of the invention.

EXAMPLE 1

After 3.326 g of a chloroplatinic acid solution (platinum content: 15.031% in weight) was diluted with 300 ml of water, 4.5 g of acetylene carbon black was added thereto and sufficiently dispersed with an ultrasonic homogenizer. After 31 ml of a propargyl alcohol aqueous solution which had been prepared by ten times dilution with water was added to the above suspension and stirred for two hours, the suspension was filtered and washed with 0.5 liter of pure water to obtain platinum compound supported carbon black after the drying at 60° C. for six hours. The platinum compound supporting carbon black thus obtained was thermally treated in a hydrogen-nitrogen mixed flow containing 10% of hydrogen at 250° C. for 30 minutes to obtain platinum supported carbon black.

The measurement of the platinum containing rate, the measurement of a specific surface area of the platinum and the observation of the state of the platinum particle dispersion by means of a transmission electronic microscope were conducted. As a result, the platinum containing rate was 9.8% in weight which was near to the target value. The specific surface area of the platinum was 169 $m^2/g$ which corresponds to a platinum particle having a diameter of 16.6 Å when converted into a spherical particle. A microphotograph taken with a transmission electronic microscope of 1,000,000 magnifications is shown in FIG. 1 which clarifies that the platinum particles of 10 to 20 Å are supported on the carbon black support under the monodispersed state.

EXAMPLE 2

After 3.334 g of a chloropalladiumic acid solution (palladium content: 14.998% in weight) was diluted with 300 ml of water, 4.5 g of acetylene black was added thereto and sufficiently dispersed with an ultrasonic homogenizer. In accordance with the procedures of Example 1, a propargyl alcohol aqueous solution was added thereto and palladium supported carbon black was obtained through similar procedures.

The measurement of the palladium containing rate, the measurement of a specific surface area of the palladium by means of carbon monoxide adsorption and the observation of the state of the palladium particle dispersion by means of a transmission electronic microscope were conducted. As a result, the palladium containing rate was 9.9% in weight which was quite near to the target value. The specific surface area of the palladium was 169 $m^2/g$ which corresponds to a palladium particle having a diameter of 15.6 Å when converted into a spherical particle. In accordance with the observation with a transmission electronic microscope of 1,000,000 magnifications, the palladium particles of 10 to 20 Å were supported on the support in the state of monodispersion.

Comparative Example 1

After 3.326 g of a chloroplatinic acid solution (platinum content: 15.031% in weight) was diluted with 300 ml of water and was heated to 60° C., 6 ml of aqueous hydrogen peroxide of 28% in weight was added thereto. After 34 ml of sodium dithionate of 60 g/liter was gradually added to the above solution for 15 minutes, a suspended solution which had been prepared by suspending 4.5 g of acetylene carbon black in 300 ml of water was added to and mixed with the above platinum-containing solution. After one hour stirring, the suspended solution was filtered. After the remaining solid was washed with 0.5 liter of pure water, it was dried for 6 hours at 70° C. to obtain a platinum-supported carbon black catalyst.

The measurement of the platinum containing rate, the measurement of a specific surface area of the platinum and the observation of the state of the platinum particle dispersion by means of a transmission electronic microscope were conducted. As a result, the platinum containing rate was 9.6% in weight. The specific surface area of the platinum was 16 $m^2/g$ which corresponds to a platinum particle having a diameter of 175 Å when converted into a spherical particle. In accordance with the observation with a transmission electronic microscope of 1,000,000 magnifications, the particles of 10 to 20 Å were observed to be uniformly supported on the carbon black support, which was different from the result of the platinum surface area measured in accordance with the carbon monoxide adsorption.

Comparative Example 2

Removal of the sulfur component in the platinum-supported carbon black catalyst obtained in Comparative Example 1 was attempted by means of thermal treatment.

At first, the sulfur containing rate was measured by means of fluorescence X-rays. After this catalyst was treated in a hydrogen-nitrogen mixed flow of which hydrogen concentration was 50% for one hour at 250° C., the sulfur analysis, the measurement of a specific surface area of the platinum in accordance with the carbon monoxide adsorption and the observation with a transmission electronic microscope were conducted.

Then, the catalyst after the above treatment with the hydrogen at 250° C. for one hour was further treated in a hydrogen-nitrogen mixed flow of which hydrogen concentration was 50% for two hours at 350° C., and the sulfur analysis, the measurement of a specific surface area of the platinum in accordance with the carbon monoxide adsorption and the observation with a transmission electronic microscope were conducted for the second time. The results are shown in below Table.

Figure 2:
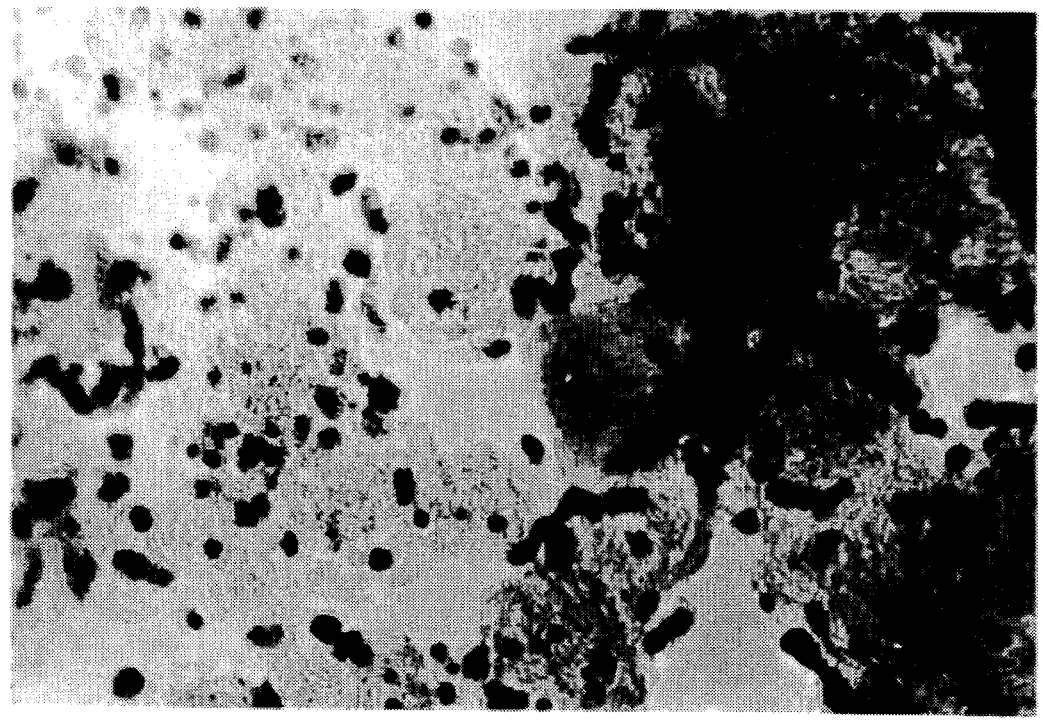
FIG. 2 is a microphotograph of 1,000,000 magnifications of the catalyst in Comparative Example 2 which was obtained by treating the platinum-supported carbon black catalyst obtained in Comparative Example 1 in the hydrogen mixed flow at 250° C. for one hour + at 350° C. for two hours observed with a transmission electronic microscope.

An enlarged surface of the thus obtained catalyst is shown in FIG. 2 which is a microphotograph of 1,000,000 magnifications of the catalyst after the two thermal treatments.

TABLE 1

| $H_2$—$N_2$ Mixed Flow Treatment | Sulfur Containing Rate (% in weight) | Pt Specific Surface Area by CO Adsorption (Converted Particle Size) | Particle Diameter Observed with Transmission Electronic Microscope |
|---|---|---|---|
| No Treatment | 3.6 | 16 $m^2/g$ (175 Å) | 10 to 20 Å |

TABLE 1-continued

| $H_2$—$N_2$ Mixed Flow Treatment | Sulfur Containing Rate (% in weight) | Pt Specific Surface Area by CO Adsorption (Converted Particle Size) | Particle Diameter Observed with Transmission Electronic Microscope |
|---|---|---|---|
| 250° C., 1 hr | 1.4 | 34 m²/g (82 Å) | 20 to 25 Å |
| 250° C., 1 hr + 350° C., 2 hr | 0.8 | 63 m²/g (45 Å) | 25 to 35 Å (*) |

(*)Remarks: Four or five Pt particles having a particle diameter of 25 to 35 Å were agglomerated and were not monodispersed (FIG. 2).

As apparent from Table 1, the sulfur component still remained even after the treatment in the hydrogen mixed flow at 250° C. for one hour + at 350° C. for two hours. Due to the contamination of the platinum surface with the sulfur, the platinum specific surface areas measured by means of the carbon monoxide adsorption are not in agreement with the particle sizes obtained through the observation with the transmission electronic microscope. This means the occurrence of the catalytic poisoning which lowered the catalytic activities.

When such an operation of removing the sulfur component to a certain degree was conducted, the increase of the platinum particle size and the association of the particles were observed so that a monodispersed platinum particle-supported catalyst having a clean and active surface and the platinum particles of which a particle size was about less than 20 Å could not be obtained.

What is claimed is:

1. A process for preparing a catalyst comprising a stable support material having highly dispersed catalytic metal particles thereon, said process comprising the steps of:

a) adding propargyl alcohol to a solution containing ions of said catalytic metal and said support material, whereby the substance resulting from such addition is deposited on said support material; and b) thermally treating the support material containing said substance in a hydrogen-containing reduction gas, at a temperature sufficient to effect reduction of said substance, to thereby provide said metal particles on the support material.

2. The process as claimed in claim 1, wherein the metal of the metal ions is at least one of platinum and palladium.

3. The process of claim 1, wherein said support material comprises carbon black.

4. The process of claim 2, wherein said temperature is at least 250° C. and is maintained for at least thirty minutes.

5. The process of claim 3, wherein said support material is thermally treated at a temperature and for a time sufficient to provide said metal particles having a particle diameter of less than 20 Å.

6. A catalyst made in accordance with the process of claim 1.

\* \* \* \* \*